(12) United States Patent
Maru et al.

(10) Patent No.: US 7,303,247 B2
(45) Date of Patent: Dec. 4, 2007

(54) INK JET PRINTING METHOD AND INK JET PRINTING SYSTEM

(75) Inventors: Akiko Maru, Kawasaki (JP); Hitoshi Nishikori, Inagi (JP); Hiroshi Tajika, Yokohama (JP); Daisaku Ide, Tokyo (JP); Takeshi Yazawa, Yokohama (JP); Atsuhiko Masuyama, Tokyo (JP); Hirokazu Yoshikawa, Kawasaki (JP); Hideaki Takamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 11/209,629

(22) Filed: Aug. 24, 2005

(65) Prior Publication Data

US 2006/0044338 A1 Mar. 2, 2006

(30) Foreign Application Priority Data

Aug. 30, 2004 (JP) ............................. 2004-251077

(51) Int. Cl.
B41J 2/205 (2006.01)
(52) U.S. Cl. ............................ 347/15; 347/41; 358/1.9
(58) Field of Classification Search .................. 347/15, 347/41; 358/1.9, 1.2, 502, 3.13, 3.23, 517
See application file for complete search history.

(56) References Cited

U.S. PATENT DOCUMENTS 5,633,663 A 5/1997 Matsubara et al.
5,739,828 A 4/1998 Moriyama et al.
6,278,469 B1* 8/2001 Bland et al. .................. 347/19
6,367,908 B1* 4/2002 Serra et al. .................... 347/37
6,443,556 B1* 9/2002 Garcia et al. ................. 347/43
6,771,379 B2* 8/2004 Vilanova et al. ........... 358/1.14

FOREIGN PATENT DOCUMENTS

| JP | 1-281944 | 11/1989 |
|---|---|---|
| JP | 5-278232 | 10/1993 |
| JP | 7-52389 | 2/1995 |
| JP | 3184744 | 4/2001 |
| JP | 2002-144552 | 5/2002 |

* cited by examiner

*Primary Examiner*—Lamson Nguyen
(74) *Attorney, Agent, or Firm*—Fitzpatrick, Cella, Harper & Scinto

(57) ABSTRACT

A mask pattern is employed for multi-pass printing. The mask pattern is the sum of a first mask pattern, relative to a first location that includes areas wherein dots are to be printed when a density value is smaller than a predetermined value, and a second mask pattern, relative to a second location that includes areas wherein dots are to be printed only when the density value is equal to or greater than the predetermined value. Using multiple scans, up to one dot is printed in the first region, while two dots or more are printed in the second region. With this arrangement, since the first mask pattern, which greatly affects a low-duty image, and the second mask pattern, which greatly affects a high-duty image, can be independently designed, problems that occur with images prepared at individual duties can be coped with by the separate mask patterns.

10 Claims, 11 Drawing Sheets

INK JET PRINTING METHOD AND INK JET PRINTING SYSTEM

BACKGROUND OF THE INVENTION

1. Field of the Invention

The present invention relates to an ink jet printing method and an ink jet printing system for presenting information having a predetermined density on a print medium using a printing agent.

2. Description of the Related Arts

As the information processing apparatuses, such as personal computers, have spread, print apparatuses have been rapidly developed and have become popular as image forming terminals. Of the various types of print apparatuses presently available, ink jet print apparatuses, which to print by ejecting ink through discharge orifices onto printing media such as paper, cloth, plastic sheets and OHP sheets, have extremely superior characteristics, e.g., low-noise, non-impact type printing systems are employed, printing can be performed at a high dot density and at a high speed, color printing can be easily coped with, and prices are low. Today, ink jet print apparatuses constitute the mainstream of the print apparatuses available for personal use.

Continuing, accelerated technological advances in inkjet printing have yielded improvements in image quality, increases in operating speeds and reductions in prices that, taken together, have contributed greatly to the extended use of personal print apparatuses, paralleling the use today of personal computers and digital cameras (including not only self-contained cameras but also integrated components, of apparatuses such as cellular phones, that function as cameras). However, because the print apparatuses are widely used, a personal user demand has arisen for apparatuses which have improved image quality capabilities, and as a consequence, a particularly recent demand has arisen for home printing systems that can easily print pictures having image qualities equivalent to those of silver halide photography.

When an image printed by an ink jet print apparatus is compared with one produced by so-called ordinary silver halide photography, the granularity is viewed as an appropriate problem. Recently, a variety of countermeasures to minimize the granularity have been proposed, and many print apparatuses that incorporate these countermeasures have also been provided. For example, one ink jet print apparatus comprises an ink system that not only has common cyan, magenta, yellow and black ink, but also light cyan and magenta, which have lower densities. With this ink system, when light cyan or magenta is employed in a low density area, the dotted appearance can be minimized. Furthermore, when common cyan and magenta are used for printing in high density areas, greater and smoother tones can be reproduced.

Another method is one whereby, in order to minimize the granularity, a design is provided that reduces each dot size landing on a printing medium. For this method, the technology has been developed for reducing the size of ink volume to be discharged from individual printing elements arranged in a print head. In this case, not only is the size of the ink droplets reduced, but also, an arrangement including a greater number of printing elements is arranged in a higher density, so that a high resolution image can be formed with no decrease in printing speed.

For a personal use ink jet print apparatus, in addition to the acquisition of a high quality image, one almost the equivalent of a photograph, as described above, the apparatus is often desired that can also output general documents, such as text and charts or tables. For such documents, the speed at which printing is performed is more important than the ability to provide an image quality equivalent to that of a silver halide photograph. Therefore, a plurality of printing modes are provided for a general purpose ink jet print apparatus, so that a desired mode can be selected, as needed, by a user (see, for example, Japanese Patent Application Laid-Open No. 1-281944(1989)).

However, not all technological developments provided for the improvement of image quality can harmoniously coexist with a need to reduce costs and with printing modes for which the focus is on high speed printing. For example, for an ink jet print apparatus, for which the amount of ink discharged (hereinafter referred to as the discharged volume) by a printing element cannot be changed, in order to minimize the granularity, all the ink droplets discharged through the individual printing elements in a print head are defined as small droplets, having a fixed volume. The dots printed using the determined discharge volume are arranged at a preferred dot density, so that a desired density can be obtained (see, for example, the specification of Japanese Patent No. 03184744). Therefore, as the discharged volume is reduced, the printing dot density required to obtain a desired print density is increased, and accordingly, the configuration means and the required data processing are fixed, to a degree, and are complicated. Therefore, in a mode in which high speed printing is expected, the printing performed must depend on the configuration means and the data processing method described above, if a desired density is to be obtained. As a result, it is difficult for an appropriate density to be provided at a satisfactory printing speed.

SUMMARY OF THE INVENTION

To resolve the above described shortcomings, the present invention can provide an ink jet printing method and an ink jet printing system, for performing data processing and data printing at a printing dot density lower than a satisfactory printing dot density obtained by a discharged volume of ink, and for, as the occasion may require, coping with several image problems, the importance levels of which vary in accordance with the printing duty, and a control program for executing the ink jet printing method.

A first aspect of the present invention is an ink jet printing method for printing an image of dots on a printing medium by scanning a print head for printing dots, comprising the steps of: selecting a dot arrangement pattern determining a presence/absence of dots in multiple areas that constitute a pixel, in accordance with a density value for the each of multiple pixels; distributing print dot data which based on the dot arrangement pattern selected in the selecting step to the multiple scans of the print head by a mask pattern, and generating print dot data corresponding to each of multiple scans; and printing dots using the print head in accordance with the generated print dot data, wherein the mask pattern is the sum of a first mask pattern and a second mask pattern, the first mask pattern corresponding to a first location that includes areas wherein dots are to be printed even if the density value is smaller than a predetermined value, and a second mask pattern having a characteristic differing from that of the first mask pattern and corresponding to a second location that includes areas wherein dots are to be printed only when the density value is equal to or greater than the predetermined value.

A second aspect of the present invention is an ink jet printing system for printing an image of dots on a printing medium by scanning a print head for printing dots, comprising; means for preparing print dot data in consonance with each of multiple scans, employing a mask pattern to sort print dot data which based on the dot arrangement pattern that is allocated, for the multiple scans performed by the print head; and means for selecting a dot arrangement pattern determining a presence/absence of dots in multiple areas that constitute a pixel, in accordance with a density value for the each of multiple pixels; means for distributing print dot data which based on the dot arrangement pattern selected by the selecting means to the multiple scans of the print head by a mask pattern, and generating print dot data corresponding to each of multiple scans; and means for printing dots using the print head in accordance with the generated print dot data, wherein the mask pattern is the sum of a first mask pattern and a second mask pattern, the first mask pattern corresponding to a first location that includes areas wherein dots are to be printed even if the density value is smaller than a predetermined value, and a second mask pattern having a characteristic differing from that of the first mask pattern and corresponding to a second location that includes areas wherein dots are to be printed only when the density value is equal to or greater than the predetermined value.

The above and other objects, effects, features and advantages of the present invention will become more apparent from the followings description of embodiments thereof taken in conjunction with the accompanying drawings

The above and other objects, effects features and advantages of the present invention will become more apparent from the following description of embodiments thereof taken in conjunction with the accompanying drawings.

DETAILED DESCRIPTION OF THE PREFERRED EMBODIMENTS

First Embodiment

A first embodiment of the present invention will now be described in detail.

Figure 1:
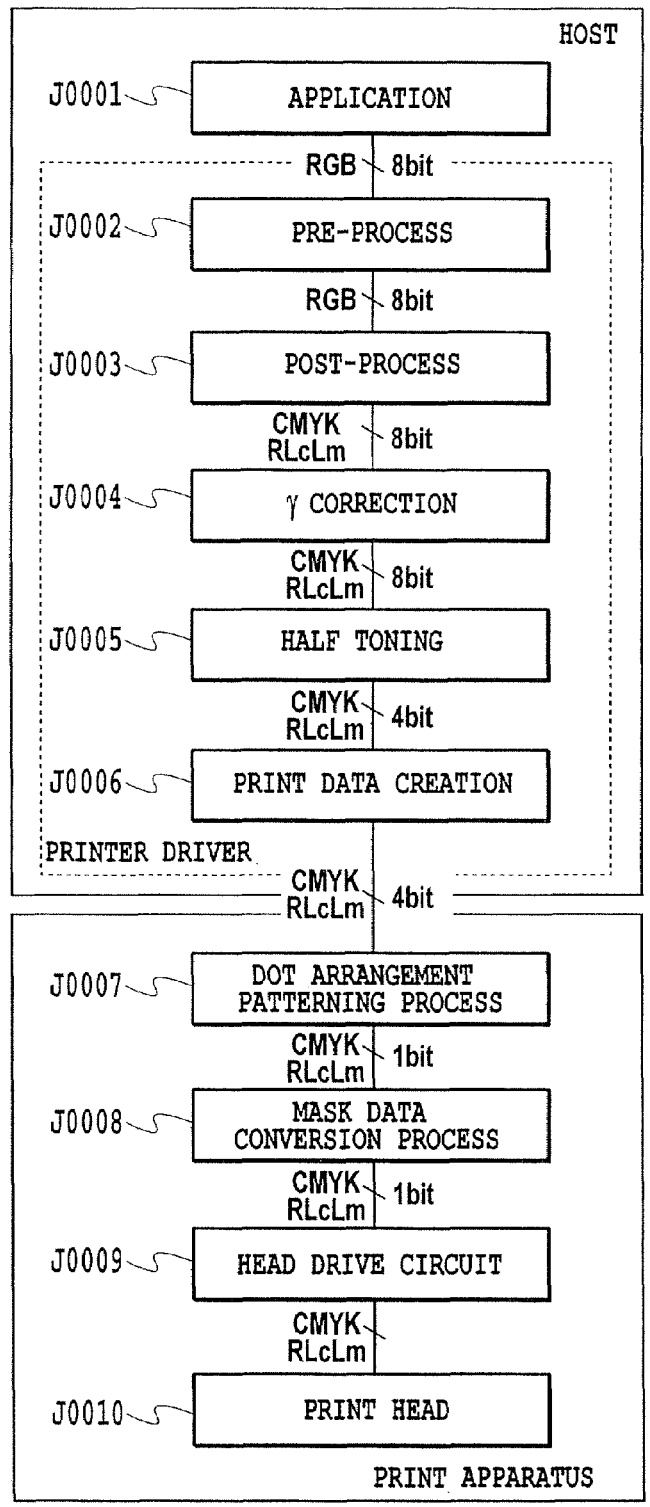
FIG. 1 is a block diagram for explaining the image data conversion processing performed according to a first embodiment of the present invention.

FIG. 1 is a block diagram for explaining the image data conversion processing according to the first embodiment. An ink jet print apparatus employed for this embodiment performs printing by using red, light cyan and light magenta ink, in addition to basic ink colors, cyan, magenta, yellow and black, so that a print head is prepared that discharges these seven colors of inks. As shown in FIG. 1, assume that the individual processes are performed by the ink jet print apparatus or a personal computer (a PC) that serves as the host.

Programs executed by the operating system of the host are, for example, an application and a printer driver, and an application J0001 performs a process for creating image data to be printed by the ink jet print apparatus. For the actual printing, image data created by the application are transmitted to the printer driver.

Using the printing system of this embodiment, a user can select a printing mode for the printer driver in consonance with an intended purpose. In this embodiment, at least two printing modes, a high-quality-photo mode and a high-speed mode, can be selected, and the processes that follow the process performed by the printer driver can be designed independently, in accordance with the printing mode.

The processing performed when the high-quality-photo mode is used for printing will now be described.

For this processing, included for the printer driver of this embodiment are a preprocess J0002, a postprocess J0003, a γ correction J0004, a half toning process J0005 and a print data creation process J0006. The individual processes will be briefly explained. The preprocess J0002 performs the mapping of a color gamut. Then, data conversion is performed to project, within a color gamut reproduced by the ink jet print apparatus, the color gamut reproduced by image data R. G and B of the sRGB standards.

Specifically, by employing three dimensional LUT, 8 bit R, G and B data are converted into B bit R. G and B data having different contents.

During the postprocess J0003, based on the R. G and B data for which the color gamut is mapped, color separation data Y, M, C, K, R, Lc and Lm are obtained that are consonant with ink combinations that reproduce the colors represented by the R, G and B data. For the postprocess J0003, as well as for the preprocess J0002, interpolation calculation is also performed using the three-dimensional LUT.

During the γ correction J0004, gray level transformation is performed for the color separation data for each color that is obtained by the postprocess J0003.

Specifically, a one-dimensional LUT is employed that is consonant with the gradation characteristics of individual ink colors used by the ink jet print apparatus, and conversion is performed so that the color separation data are linearly correlated with the gradation characteristics of the ink jet print apparatus.

During the half toning process J0005, the quantization process is performed for the 8 bit color separation data Y, M, C, K, R, Lc and Lm to obtain 4 bit data. In this embodiment, the error diffusion method is employed to convert 8 bit data having 256 gradation levels to 4 bit data having 9 gradation levels. The 4 bit data is used as an index for indicating, in a dot arrangement patterning process, an arrangement pattern to be performed by the ink jet print apparatus.

For the print data creation process J0006, the final process performed by the printer driver, print control information is added to print image data that include the above described 4 bit index data, and print data are obtained.

The ink jet print apparatus performs the dot arrangement patterning process J0007 and a mask data conversion process J0008 for the received print data.

The dot arrangement patterning process J0007 in the high-quality-photo mode for this embodiment will now be described. In the above-described half toning process J0005, the 256 gradation levels of the multi-value density information (8 bit data) are reduced to the 9 gradation levels of the gradation information (4 bit data). However, information actually printable by the ink jet print apparatus of this embodiment is binary information used to determine whether or not ink has been printed. For the dot arrangement patterning process J0007, a multi-value level of 0 to 8 is reduced to the binary level to determine the presence or absence of a dot. Specifically, in the dot arrangement patterning process J0007, for each pixel represented by 4-bit data for levels 0 to 8, which are values output by a half tone processor, a dot arrangement pattern corresponding to the gradation value (levels 0 to 8) of the pertinent pixel is allocated. Then, ON/OFF is defined for the dots for multiple areas in a pixel, and one bit of discharge data, a "1" or a "0", is entered in each area of the pixel.

Figure 2:
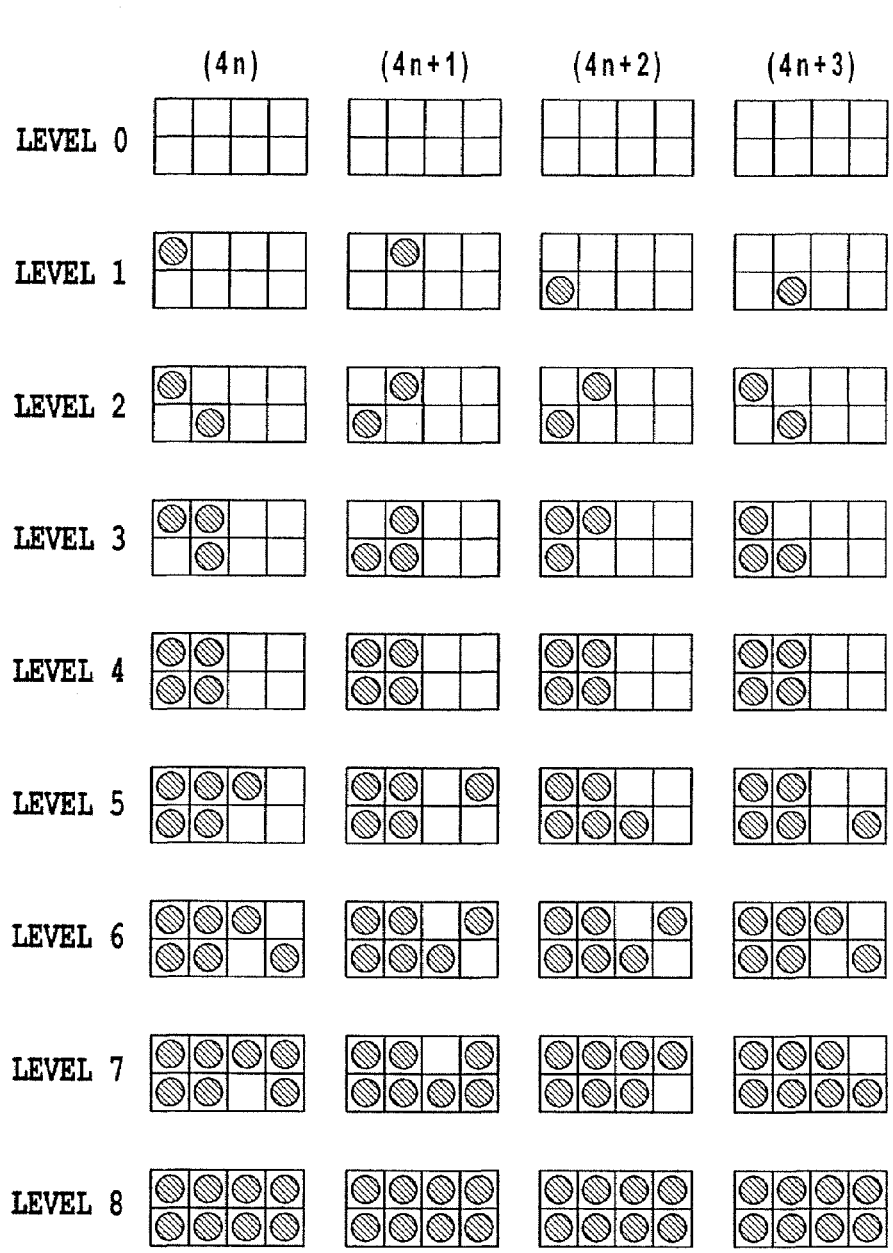
FIG. 2 is a diagram showing output dot patterns, relative to input levels 0 to 8, obtained through conversion, during the dot arrangement patterning processing, in a high quality photo mode according to the embodiment of the present invention.

FIG. 2 is a diagram showing output patterns, relative to input levels 0 to 8, obtained through conversion during the dot arrangement patterning process in the high-quality-photo mode for this embodiment. The level values on the left correspond to levels 0 to 8, which are values output by the half tone processor. Each area defined vertically by two blocks and horizontally by four blocks arranged to the right, corresponds to an area of one pixel output during the half toning process, and is vertically and horizontally equivalent to the size of a pixel having a density of 600 ppi (pixel/inch). Each area in a pixel corresponds to the minimum unit, for a dot, for which ON/OFF is defined, and is equivalent to a vertical printing density of 1200 dpi (dot/inch) and a horizontal printing density of 2400 dpi. The ink jet print apparatus of this embodiment is designed so that, to obtain a desired density, one ink droplet of 2 pl is printed in an area that is about 20 μm vertically and about 10 μm horizontally, which is consonant with the above described printing density.

In FIG. 2, the vertical direction is the direction in which the discharge orifices of the print head are arranged, and the array density of the areas and the array density of the discharge orifices match to produce a density value of 1200 dpi. The horizontal direction indicates the scanning direction of the print head, and in the high-quality-photo mode of this embodiment, the print head performs printing at a printing density of 2400 dpi.

Furthermore, in FIG. 2, areas wherein circles are entered indicate those wherein dots are printed, and as the density level is increased, the number of dots printed is incremented by one.

(4n) to (4n+3) indicate pixel positions in the horizontal direction, beginning at the left end of an input image, produced by substituting an integer of 1, or greater, into n. Below (4n) to (4n+3), even at the same input level, multiple differing patterns are prepared in accordance with the pixel positions. That is, when a pixel is input at the same level, four types of dot arrangement patterns, shown for (4n) to (4n+3), are cyclically allocated to a printing medium. With this arrangement, various effects can be obtained, e.g., the number of discharging times can be varied between a nozzle located at an upper level, and a nozzle located at a lower level, or various noises inherent to the ink jet print apparatus can be dispersed.

As a result, in the high-quality-photo mode of this embodiment, density information for the original image is reflected in this manner, and when the dot arrangement patterning process has been completed, the entire dot arrangement pattern is determined for a printing medium.

The mask data conversion process J0008 in the high-quality-photo mode will now be described.

Since the presence or the absence of a dot in each area of the printing medium has been determined during the above described dot arrangement patterning process, only this information need be transmitted directly to the drive circuit of the print head to print a desired image. However, a multi-pass printing method is generally employed for the ink jet print apparatus.

The multi-pass printing method will now be briefly explained.

Figure 3:
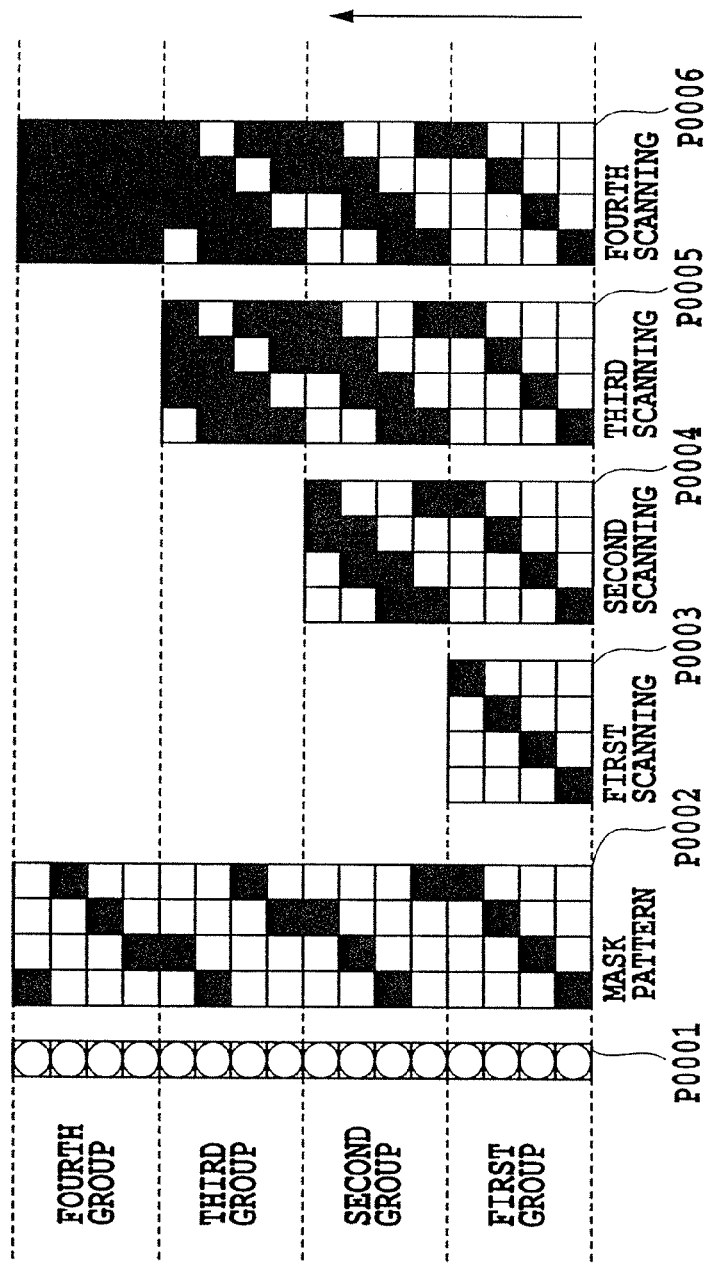
FIG. 3 is a schematic diagram showing a print head and a printing pattern used to explain a multi-pass printing method.

FIG. 3 is a schematic diagram showing a print head and a printing pattern used to explain the multi-pass printing method. To simplify the explanation, assume that a print head P0001 includes 16 nozzles. The nozzles are divided into four groups, a first to a fourth group, each of consists of four nozzles. In a mask pattern P0002, areas (printable portions) shown in solid black are those wherein printing through the individual nozzles is enabled. Patterns printed by the nozzle groups complement each other, and when the patterns are superimposed, the printing of a pattern corresponding to a 4×4 area is completed.

Patterns P0003 to P0006 are the states wherein an image is formed by repeating the scanning. Each time the scanning is terminated, the printing medium is conveyed at distance equivalent to the width of the nozzle group in the direction indicated by an arrow in FIG. 3. Therefore, by scanning one area of the printing medium (the area corresponding to the width of each nozzle group) four times, an image can be completed. As described above, since an image in an identical area on the printing medium is formed by multiple nozzle groups and by performing multiple scans, variances unique to the nozzles and discrepancies in the accuracy with which the printing medium is conveyed, for example, can be reduced.

Figure 4:
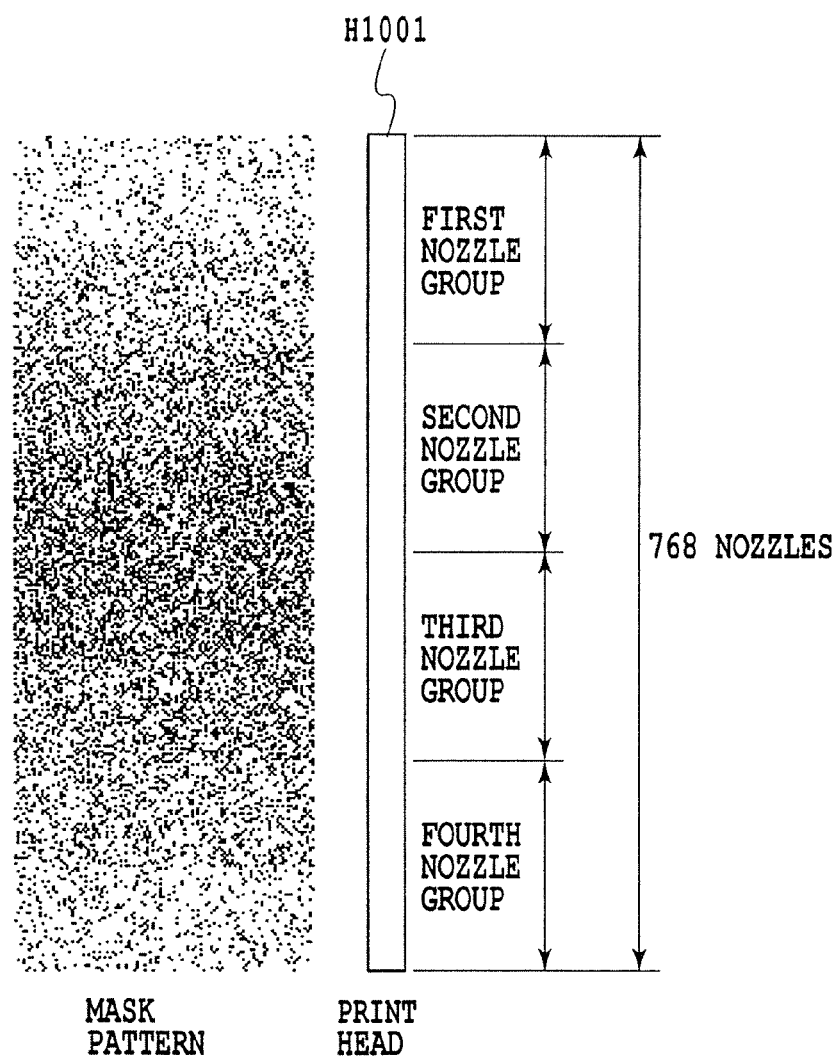
FIG. 4 is a diagram showing a mask pattern that is actually employed in the high quality photo mode for the first embodiment of the present invention.

FIG. 4 is a diagram showing a mask pattern actually employed in the high-quality-photo mode of this embodiment. The black areas in the mask pattern in FIG. 4 correspond to the black areas in the mask pattern in FIG. 3 wherein printing is permitted. The white areas in the mask pattern in FIG. 4 correspond to the white areas in the mask pattern in FIG. 3 wherein printing is not permitted.

A print head H1001 used for this embodiment has 768 nozzles, and assuming that in the high-quality-photo mode multi-pass printing is performed, as in FIG. 3, along four passes, in each of four nozzle groups there are 192 nozzles.

Vertically, the mask pattern has 768 areas, which equals the number of nozzles, and horizontally, has 256 areas, and among the four nozzle groups, a complementary relationship is established.

For an ink jet print head, like the one employed for this embodiment, that discharges multiple small droplets at a high frequency, it has been confirmed that during a printing operation an air stream is generated in the vicinity of the discharging unit that adversely affects the direction in which ink is discharged, especially from the nozzles located at the ends of the print head. Therefore, as is apparent from FIG. 4, in the distribution of a printing enabling ratio (also, hereinafter, referred to simply as a "printing rate") for the mask pattern used for the high-quality-photo mode of this embodiment, a deviation is introduced in accordance with the area affected and depending on the nozzle groups, and even within the same nozzle groups. As is shown in FIG. 4, for the mask pattern, the printing rate employed for the nozzles located at the ends is lower than the printing rate employed for the center portion. Specifically, the printing rate for the mask pattern corresponding to the first nozzle group is N %, the printing rate for the mask pattern corresponding to the second nozzle group is M% (M>N), the printing rate for the mask pattern corresponding to the third nozzle group is M%, and the printing rate for the mask pattern corresponding to the fourth nozzle group is N %. The total (N+M+M+N) of the printing rates of the mask pattern corresponding to these four nozzle groups is 100%. As is described above, when a mask pattern is employed wherein the printing rate for the nozzles at the ends is lower than the ratio at the center portion, a performance obstacle, an effect produced by the shifting of the positions of the ink droplets discharged through the nozzles located at the ends, can be reduced, and is less noticeable.

The printing rate (printing enabling ratio) of the mask pattern is a ratio, represented by a percentage, of the number of printing permitted areas to the total of the number of printing permitted areas (the black areas in FIG. 4) and the number of printing not permitted areas (the white areas in FIG. 4) constituting the mask pattern. The printing rate will be specifically explained. For example, since the horizontal length (the direction perpendicular to the direction in which the nozzles are arranged) of the mask pattern in FIG. 4 is equivalent to a length of 256 areas, the total of the printing permitted areas and the printing not permitted areas constituting the mask pattern corresponding to one nozzle is 256. When the printing permitted areas are 64 of 256 areas and the printing not permitted areas are 192, the printing rate of the mask pattern for this nozzle is 25% (=64/256×100).

In this embodiment, the mask data in FIG. 4 and multiple sets of mask data used for other printing modes are stored in the memory of the ink jet print apparatus. During the mask data conversion processing, AND processing is performed for the mask data and the signal output in the above described dot arrangement patterning process, and the dot actually to be printed during each scan are determined and are transmitted as output signals to a drive circuit J0009 of the print head H1001.

1 bit data received by the drive circuit J0009 for individual colors are converted into drive pulses for a print head J0010. Then, ink drops in these colors are discharged at predetermined timings by the print head.

The dot arrangement patterning process and the mask data conversion process performed by the ink jet print apparatus are controlled by a CPU that employs special hardware circuits for these processes and that serves as a controller for the ink jet print apparatus.

The processing performed when printing in a high-speed mode according to the first embodiment will now be described. The processing explained while referring to FIG. 1 can be applied for the high-speed mode; however, in the high-speed mode of this embodiment, a reduction of the processing time is aimed at by employing only the four basic ink colors, cyan, magenta, yellow and black. Therefore, in the postprocess J0003, 8 bit R. G and B data are converted into 8 bit C, M, Y and K data, and in the succeeding process, the data for the four colors C, M, Y and K are handled.

In the half toning process J0005, as well as in the high-quality-photo mode, quantization is performed to convert 8 bit color separation data into 4 bit data. During the high-speed mode of this embodiment, however, instead of the error diffusion method, a multi-valued dither pattern is employed to perform quantization, and 256 gradation levels of 8 bit data are converted into S gradation levels of 4 bit data that is, as in the high-quality-photo mode, 4 bit data are obtained as index data used to indicate an arrangement pattern in the dot arrangement patterning process, but the contents of the data are information for five gradation levels.

In the print data creation process J0006, print control information is added to print image information that includes the 4 bit index data, and print data are obtained. This process is the same as that in the high-quality-photo mode.

In the same manner as in the high-quality-photo mode, the ink jet print apparatus performs the dot arrangement patterning process J0007 and the mask data conversion process J0008 for the received print data.

The dot arrangement patterning process J0007 in the high-speed mode of this embodiment will now be described. During the dot arrangement patterning process in the high-speed mode, multi-value levels of 0 to 4 are reduced to a binary level to determine the presence or absence of a dot. Specifically, for each pixel that is represented by 4-bit data of levels 0 to 4, which are values output by the half tone processor, a dot arrangement pattern is allocated that is consonant with the gradation value (level 0 to 4) of the pertinent pixel. Then, ON/OFF of the dot is defined for each of multiple areas in one pixel, and one bit of discharge data, "1" or "0", is entered in each area of a pixel.

Figure 5:
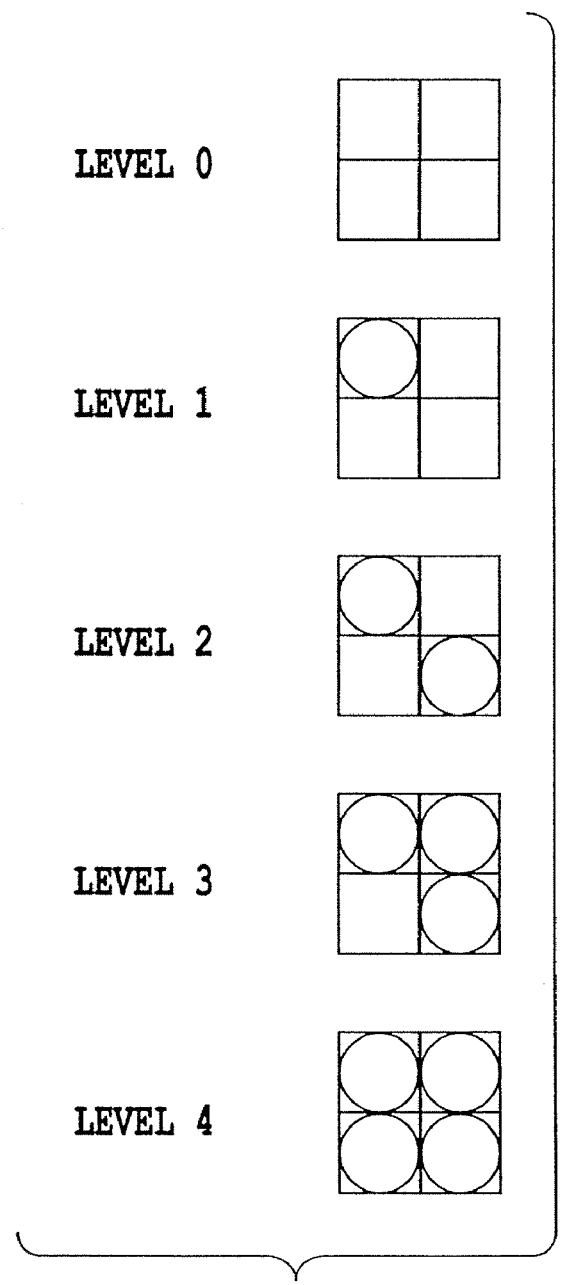
FIG. 5 is a diagram showing output patterns, relative to input levels 0 to 4, obtained by conversion, during the dot arrangement patterning processing, in a high-speed mode according to the embodiment of the present invention.

FIG. 5 is a diagram showing output patterns, relative to input levels 0 to 4, obtained through conversion, during the dot arrangement patterning process, in the high-speed mode for the first embodiment. The level values on the left correspond to level 0 to level 4, which are values output by the half tone processor. Each of the matrixes formed by two vertical areas and two horizontal areas arranged to the right is the area of one pixel output in the half toning process. According to the above described high-quality-photo mode, at a printing density of 1200 dpi vertically and 2400 dpi horizontally, dots are printed in the area of one 600 ppi pixel output during the half toning process. In the high-speed mode at a printing density of two vertical areas and two horizontal areas, dots are printed in the area of one 600 ppi pixel.

Furthermore, in the high-speed mode, unlike in the high-quality-photo mode described while referring to FIG. 2, multiple types of dot arrangement patterns are not cyclically allocated for a single level. Instead, only one type of dot arrangement pattern is allocated for each of the levels.

As is described above, in the high-speed mode of this embodiment, the size allocated for each pattern is small, i.e., two areas×two areas, and only one type of pattern is cyclically allocated. Therefore, compared with the high-quality-photo mode, the memory area required for storing the dot arrangement pattern can be reduced.

Figure 6:
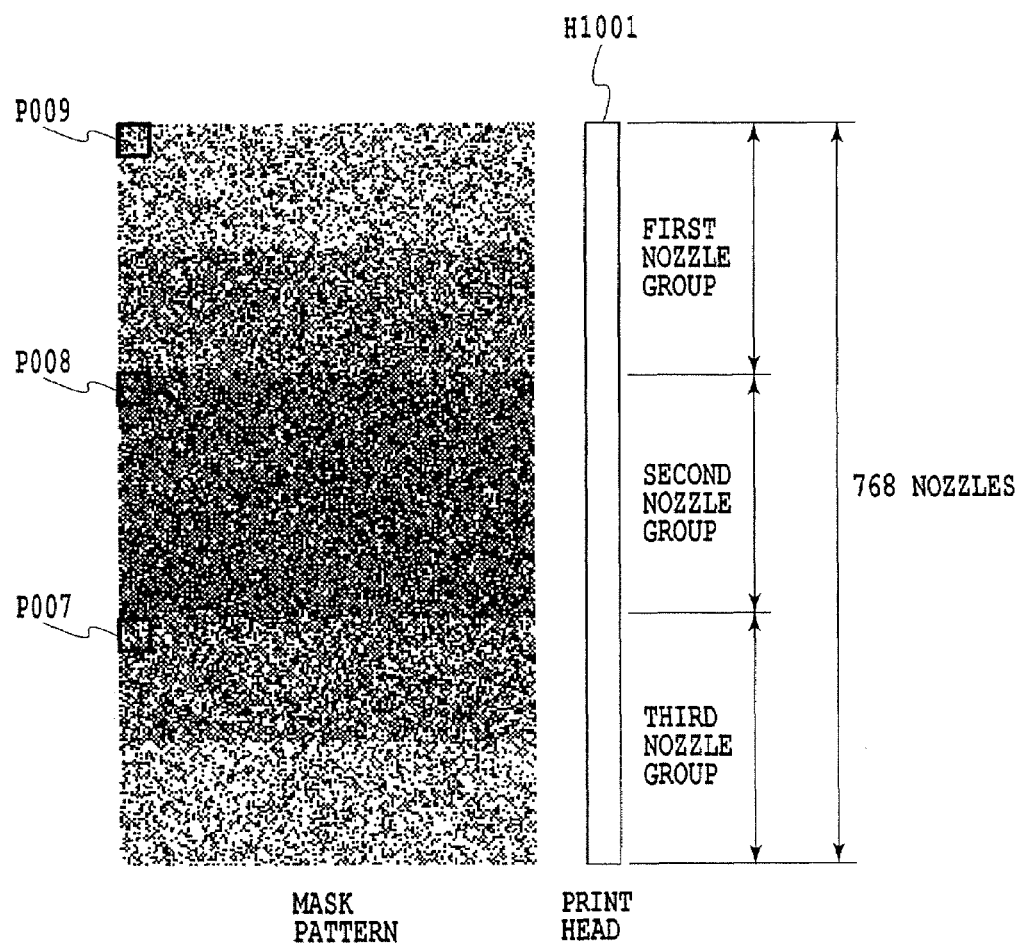
FIG. 6 is a diagram showing a mask pattern that is actually employed in the high-speed mode for the embodiment of the present invention.

The mask data conversion process J0008 performed in the high-speed mode of this embodiment will now be described. FIG. 6 is a diagram showing a mask pattern actually employed in the high-speed mode of this embodiment. The print head H1001 of this embodiment has 768 nozzles, and since in this case, 3-passes printing is performed, 768 nozzles are divided into three nozzle groups, in each of which there are 256 nozzles. The size of the mask pattern is 768 areas vertically, which is equal to the number of nozzles, and 386 areas horizontally. In the high-speed mode of this embodiment, each nozzle group performs 50% of the printing, on the average, and by superimposing three nozzle groups, a printing of 150% is performed.

The purpose and the arrangement used for the printing of 150% will now be described in detail. As described above, according to the high-speed mode of this embodiment, in the dot arrangement patterning process explained while referring to FIG. 5, only up to four dots are printed in an area represented by one pixel output by the half toning process J0006. However, as explained for the high-quality-photo mode, the ink jet print apparatus of this embodiment is so designed that, relative to one pixel, a maximum of eight small droplets of 2 pl can be printed. Therefore, when, in the high-speed mode, printing with four dots per one pixel is continued, a condition develops in which there is shortage of dots for pixels, and accordingly, an image having an inappropriate density is obtained. In this embodiment, this dot shortage in the high-speed mode is compensated for by performing the mask data conversion process.

Figure 7:
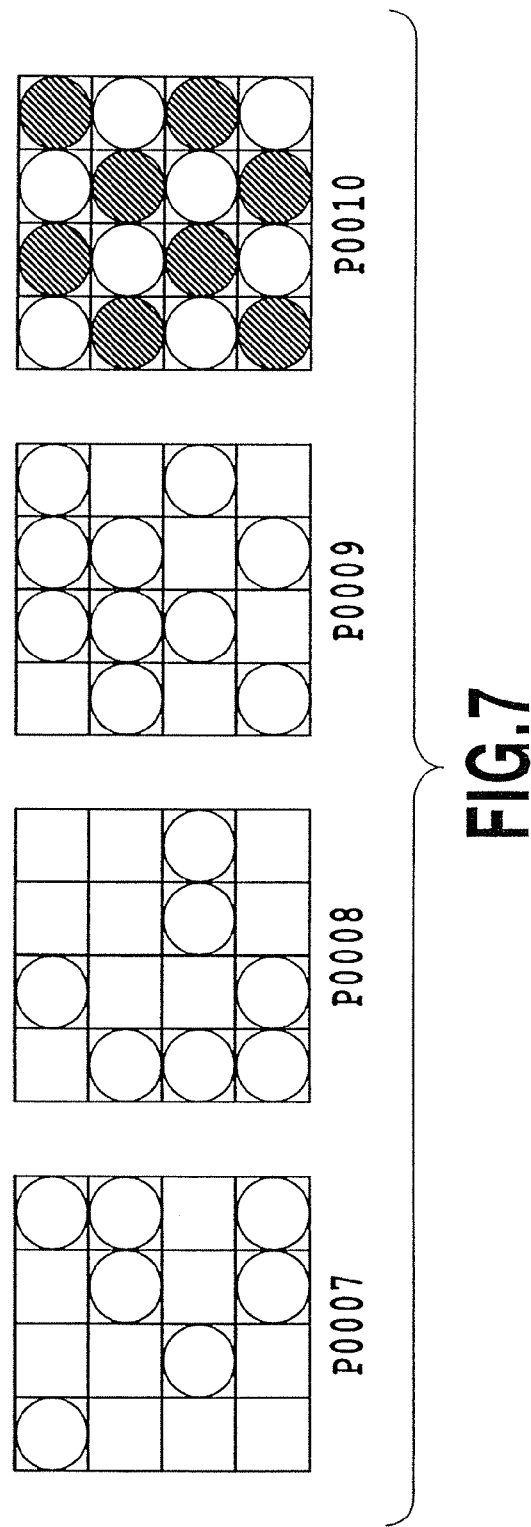
FIG. 7 is an enlarged diagram showing areas located to the upper left of areas of the mask pattern corresponding to the individual nozzle groups.

FIG. 7 is an enlarged diagram showing pattern segments P0007 to P0009, 4×4 areas located to the upper left of the segments in the mask pattern that correspond to the individual nozzle groups. When these three segments are used in printing and superimposed on a printing medium, the result shown in pattern P0010 is obtained. In the patterns P0007 to P0009, portions indicated by white circles represent areas where 2 pl ink droplets are to be printed by the scanning. In the pattern P0010, portions indicated by white circles represent areas wherein one 2 pl dot is to be printed, and portions indicated by black circles represent areas wherein two 2 pl dots, i.e., as an ink droplet having a 4 pl discharge volume, are to be printed. As shown in the pattern P0010, the black circles and the white circles are located in alternate areas. And as a result, a similar pattern is formed by the arrangement of the dots within a pixel, i.e., in the 2×2 block areas, in each of which a maximum six ink droplets can be printed.

Figure 8:
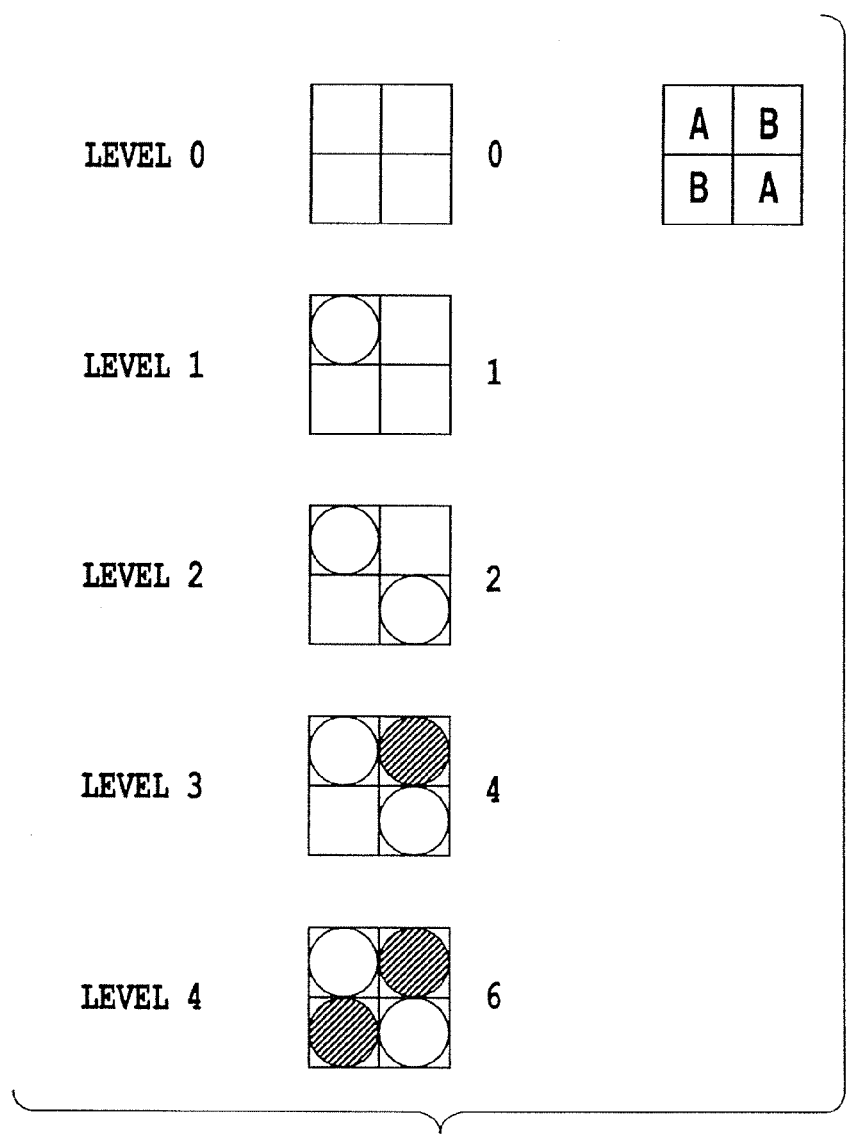
FIG. 8 is a diagram showing the states and, as the results, the number of dots printed relative to input levels 0 to 4.

FIG. 8 is a diagram showing the states of dots and the number of dots that, as a result, are printed relative to the input levels 0 to 4 shown in FIG. 5. In FIG. 8, white circles indicate areas wherein one 2 pl ink droplet is to be printed, the black dots indicate areas wherein two 2 μl ink droplets are to be printed, and the blank portions indicate areas wherein no ink droplets are to be printed. As is shown in FIG. 8, from level 0 to level 2, one dot is added each time the level count is incremented, while at level 3 and at level 4, two new dots are added, by 1 level stepping up. Generally, for the ink jet print apparatus, since the granularity is a problem in a low gradation area, the dots should be as little noticeable as possible. Further, the density is not easily increased in a high gradation area merely by the addition of a single dot, and the highest possible density is desired.

Therefore, according to the arrangement of this embodiment, as the density is increased, a larger number of dots is added, until for a pixel, a maximum six dots are printed in each 2×2 block area.

The present invention is not limited to this number of dots. The maximum number of dots to be printed may be greater than six. When the number of printing dots at the highest density is conformed to those in the high-quality-photo mode, the printing of eight dots is requested at level 4. However, glossy printing media that can accept a large volume of ink tend generally to be employed in a mode, such as the high-quality-photo mode, wherein image quality is regarded as important, while printing media, such as plain paper, that can not accept a large volume of ink are generally employed in the high-speed mode for printing documents, such as tables and text. Therefore, in the high-speed mode of this embodiment, less ink is required than in the high-quality-photo mode.

Regardless of the number of dots defined, the effects available with the present invention can be obtained, so long as dots greater than (or smaller than) the number of areas defined in the dot arrangement patterning process are printed, and so long as the number of dots to be printed can be definitely determined in accordance with each level in the dot arrangement patterning process. With this arrangement, one output pattern can be correlated with one input level, and at each level, a dot pattern arrangement is obtained wherein, in an appropriate state, an enhanced dot is added. In other words, with the assumption that the dot pattern arrangement enhanced as shown in FIG. 8 is output, the previous processes (i.e., from the preprocess to the half toning process) can be performed. Further, since the locations of areas wherein multiple dots are to be printed are predesignated, the following processes can be performed for the mask pattern.

An example for a more effective mask pattern for carrying out the present invention will now be explained. As explained while referring to FIGS. 7 and 8, in the high-speed mode of this embodiment, the areas (the black circles) wherein two dots are to be printed and the areas (the white circles) wherein only one dot is to be printed are alternately arranged, and similar matrixes, each formed of two areas× two areas, are repetitively arranged vertically and horizontally. Of two areas×two areas, the upper left area and the lower right area are defined as locations A, while the upper right area and the lower left area are defined as locations B. At the maximum, only one dot is printed in locations A, while up to two dots are printed in locations B. Further, for locations A, dots are provided at level 1 to level 4; and at levels 1 and 2, in particular, dots are provided only for locations A. Therefore, at a low level an image is greatly affected by the printing in locations A.

On the other hand, printing is performed only at high levels, levels 4 and 5, for locations B, at each of which two dots are printed. Therefore, for an image at a high level, more dots are printed at locations B than are printed at locations A, and the image is easily affected by the printing at locations B.

Generally, the type of problem that affects the image quality differs between an image having a low density (a low duty), printed by low level signals, and an image having a high density (a high duty), printed by high level signals. For example, the granularity generated by a deviation in the visible dots is a problem for an image having a low duty, while this is not a big problem for an image having a high duty. In addition, the mechanical noise problem associated with the print apparatus, such as a discharge variance at the nozzles, the discrepancies affecting the accuracy with which a printing medium is conveyed, or the shifting of the positions at which the ink lands during bidirectional printing, produces un-uniformity of density or imaging problems, such as a textured pattern. This problem tends to be noticeable when and image has a high duty.

That is, when, as in this embodiment, a printing position that affects the quality of an image having a low duty or of an image having a high duty can be clearly classified either as location A or location B, a characteristic printing process can be performed for the pertinent printing position. Or, for example, a mask pattern that mainly renders the doted appearance less apparent can be employed for a location A, while a mask pattern that mainly renders the mechanical noise problem less noticeable can be employed for a location B.

Figure 9A:
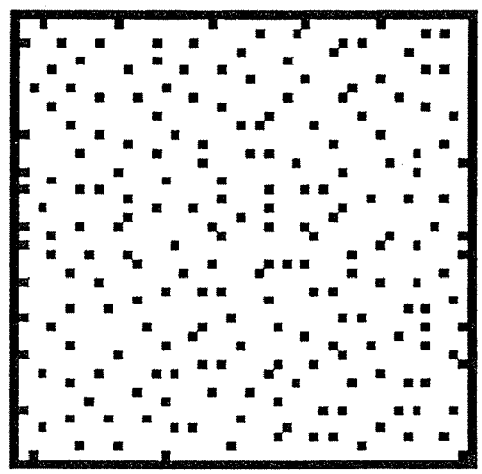
FIGS. 9A and 9B are schematic diagrams for separately explaining, for location A and location B, a mask pattern is that can be used for the first embodiment of the invention.
Figure 9B:
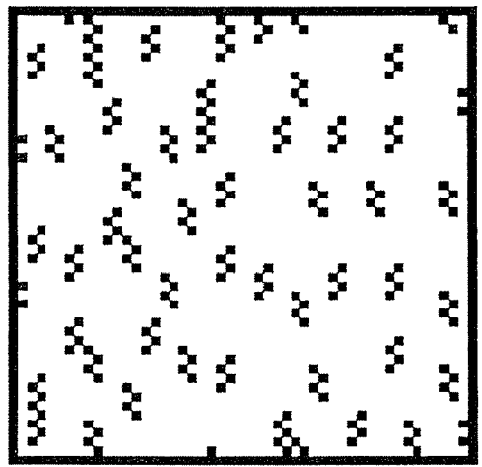

FIGS. 9A and 9B are schematic diagrams for explaining the mask patterns that, in the high-speed printing mode of this embodiment, can separately be employed for location A and location B. In this case, for example, 64 areas×64 areas are extracted from the vicinity of the segment P0009 of the mask pattern in FIG. 6. Furthermore, areas corresponding to location A for which, in accordance with the mask pattern, performance of printing has been designated (the black areas) are shown in FIG. 9A, and areas corresponding to location B for which, in accordance with the mask pattern, performance of printing has been designated (the black areas) are shown in FIG. 9B.

As is apparent from FIGS. 9A and 9B, the two mask patterns have different trends of dispersion of printing locations. In FIG. 9A, individual printing areas are comparatively dispersed, while in FIG. 9B, multiple printing areas are vertically collected, forming groups, and the individual groups are dispersed. As described above, the mask pattern in FIG. 9A is the mask pattern for location A, and the characteristics of the areas in location A appear in an image having a low duty. As described above, the dotted appearance in the image having the low duty is a problem, and in order to resolve this problem, it is preferable that dots be printed while being as widely dispersed as possible. Therefore, in this embodiment, especially in order to remove the dotted appearance, the high dispersion mask pattern shown in FIG. 9A is employed as the mask for location A. By high dispersion mask it is meant that the space frequency in the dot arrangement has a comparatively high frequency element.

For an image having a high duty, as described above, an image barrier, the result of the mechanical noise produced by the print apparatus, is a problem. As a suppression method for this problem, as shown in FIG. 9B, a mask pattern is employed whereby multiple clustered areas are defined as a single unit, and these areas are printed by a single scan. In this embodiment, for locations A and B, two mask patterns are created while different characteristics are provided and are superimposed, so that the pertinent mask pattern is obtained. Even after the two, thus formed, independent mask patterns are superimposed, the relationships applicable to location A and to location B do not affect each other, and the characteristics and the effects produced by the individual patterns are maintained.

While referring to again FIG. 1, data for 1 bit obtained in the mask data conversion process J0008 are transmitted to the drive circuit J0009 of the print head J0010. Then, the data are converted into a drive pulse for the print head J0010, and ink is discharged by the print head J0010 at a predetermined timing.

As described above, according to the embodiment, for an ink jet print apparatus wherein the printing density is so designated that a desired density can be obtained by the discharge of an ink droplet having a small, 2 pl, volume, the mask data conversion process can be performed to obtain a desired printing density, while a high-speed mode can be prepared in which an image is to be printed at a lower printing density. For an image output by using a mask pattern, a desired linearity is maintained, relative to the gradation levels for one pixel, after the half toning process has been performed. Further, the area to be enhanced in a high-duty image and the area to be printed, even in a low-duty image are classified, and characteristic mask patterns for these areas are employed. Therefore, a change that occurs in the type of image barrier encountered as the duty is changed can appropriately be coped with.

Second Embodiment

A second embodiment of the present invention will now be described. In this embodiment as well as in the first embodiment, it is assumed that the arrangement shown in FIGS. 1 to 8 can be applied for the image data conversion processing, the dot arrangement patterning processing and the mask data conversion processing, and that the high-quality-photo mode and the high-speed mode have been prepared. For an ink jet print apparatus of this embodiment, however, a special mask pattern is prepared, especially for the leading portion or the trailing portion of a printing medium whereat deterioration of the image quality tends to occur. Therefore, in the mask data conversion process J0008, the mask patterns employed differ, depending on the printing positions (the leading portions the center portion or the trailing portion) for the printing medium.

Figure 10:
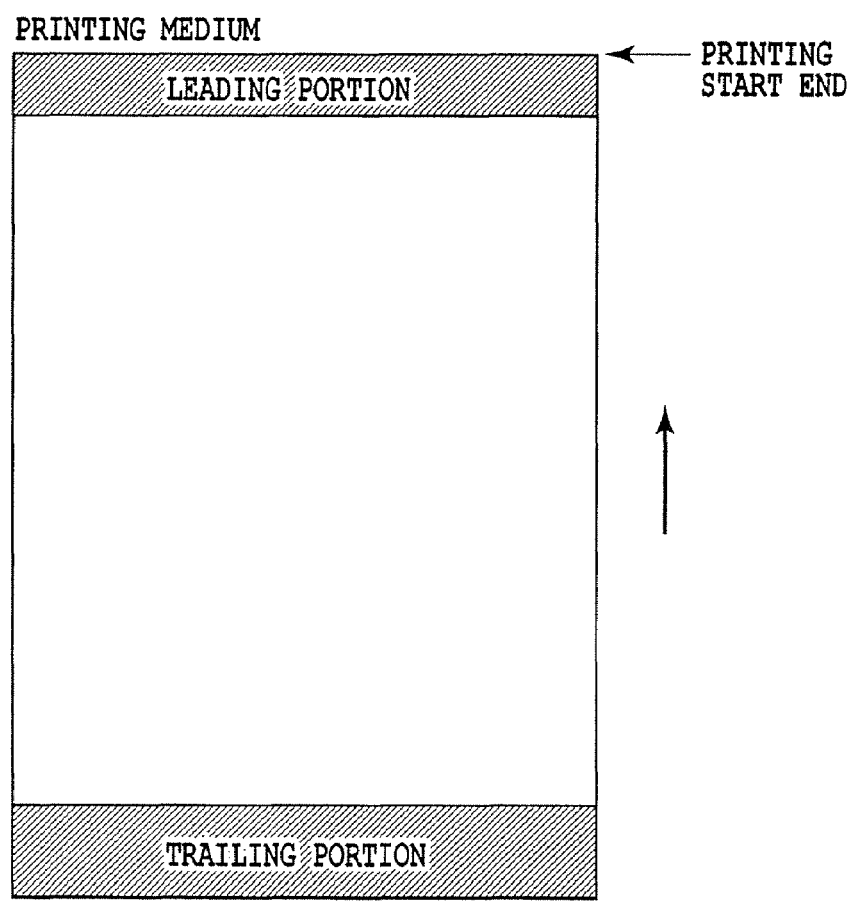
FIG. 10 is a diagram showing the leading portion, the center portion and the trailing portion of a printing medium A4 on which printing is performed by a print apparatus employed for a second embodiment of the present invention.

FIG. 10 is a diagram showing the area of the leading portion, the center area and the area of the trailing portion of an A4 printing medium for which printing is performed by the ink jet print apparatus of this embodiment. In the print apparatus of a serial type employed for this embodiment, generally, the printing medium is held by two rollers, i.e., a conveying roller and a discharge roller, and is conveyed in the direction indicated by an arrow. A print head located between these two rollers prints data on the printing medium, which is extended, supported and accurately positioned by the two rollers. Under a condition wherein the leading portion and the trailing portion are to be printed, the printing medium is supported and conveyed by only one of the two rollers. In this case, the accuracy of the conveyance of the printing medium is reduced, and accordingly, a shift tends to occur in the position whereat the discharged ink lands. As described above, in the ink jet print apparatus of this embodiment that forms images by arranging dots at predetermined locations, the image quality greatly varies, depending on whether the printing medium is supported or not supported by rollers.

To resolve this problem, for the ink jet print apparatus of this embodiment, of the multiple nozzles arranged in the print head, the number of nozzles actually employed for printing is changed in accordance with the printing position of the printing medium. That is, for a print head that in this embodiment has 768 nozzles, all 768 nozzles are employed to print the center portion of the printing medium, while a contiguous 192 nozzles are employed to print an image in the areas at the leading portion and the trailing portion of the printing medium. Accordingly, in addition to the mask pattern used for printing the center portion, a special mask pattern is prepared to using in the areas at the leading portion and the trailing portion, and the distance whereat the printing medium is conveyed by each scan is reduced from a distance equivalent to 768/3 =256 nozzles to a distance equivalent to 192/3=64 nozzles. As described above, when the travel distance for the printing medium is reduced to ¼ the normal, an error that accompanies the conveying of the medium can also be reduced to ¼ the normal, so that the deterioration of image quality that accompanies a conveying error can be suppressed.

FIGS. 11A to 11D are schematic diagrams for explaining mask patterns that can be employed in the high-speed mode of this embodiment for locations A and B. In the first embodiment, for locations A and B, characteristics are provided for dot dispersion in predetermined areas, while in the second embodiment, characteristics are provided for the distribution of a printing rate, relative to the nozzles, across the entire mask pattern area.

Figures 11A, 11B:
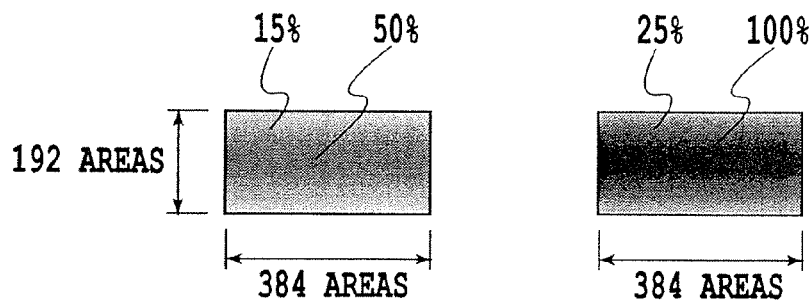
FIGS. 11A to 11D are schematic diagrams for separately explaining, for location A and location B, a mask pattern that can be employed in a high-speed printing mode for the second embodiment of the present invention.

In FIG. 11A, a mask pattern for location A is shown relative to the leading portion or the trailing portion of a printing medium. Vertically, the mask pattern has 192 areas, in consonance with the number of nozzles to be used, and horizontally, it has 384 areas. In FIG. 11B, a mask pattern relative to the leading or the trailing portion of the printing medium is shown for location B, and its size is the same as that for location A.

Figures 11C, 11D:
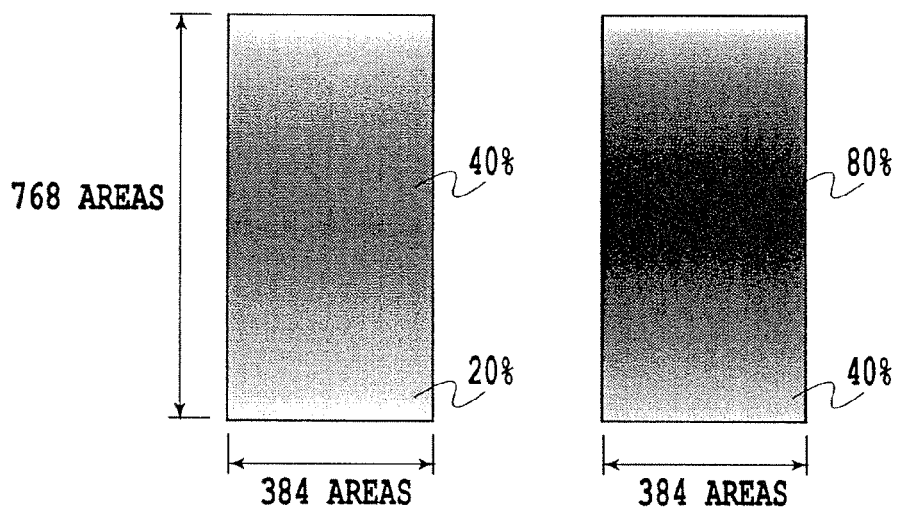

In FIG. 11C, a mask pattern for location A is shown relative to the center portion (omitting the leading portion and the trailing portion) of the printing medium. This mask pattern has 768 areas vertically, in consonance with all the nozzles to be used, and 384 areas horizontally, which is the same as those for the leading portion and the trailing portion. In FIG. 11D, a mask pattern for location B is shown relative to the center portion of the printing medium. This mask pattern has 768×384 areas, which is the same as that for location A.

Using the mask pattern for location A in FIG. 11A, all the location A areas are printed by one dot at three scans. That is, for full scanning, the printing rate is 100%. Furthermore, of the 192 nozzles that are to be used, the printing rate for the nozzles located at the ends is 15%, while the printing rate for the nozzles located in the center is 50%, and a smooth gradation mask is formed for which the center portion has the maximum value. The rate of the printing rate of the edges to the center portion is 0.3.

Using the mask pattern for location B in FIG. 11B, all the areas for location B are printed by two dots at three scans. That is, the printing rate attained by full scanning is 200%. Furthermore, of the 192 nozzles to be used, the printing rate for the nozzles located at the ends is 25%, while the printing rate for the nozzles located in the center is 100%, and a smooth gradation mask is formed for which the center portion has the maximum value. The rate of the printing rate of the edges to the center portion is 0.25, and the inclination of the printing rate from the edges to the center portion is greater than that for the mask pattern for location A.

The same trend is obtained for the mask patterns for the center portion of the printing medium shown in FIGS. 11C and 11D. In the mask pattern for location A in FIG. 11C, as well as in FIG. 11A, the printing rate through three scans is 100%. Further, of the 768 nozzles to be used, the printing rate for the nozzles located at the ends is 20%, while the printing rate for the nozzles located in the center is 40%, and a smooth gradation mask is formed for which the center portion has the maximum value. The rate of the printing rate of the edges to the center portion is 0.5. This rate is greater than that for the masks used for the leading portion and the trailing portion of the printing medium, though all of these masks are for location A. That is, the inclination of the gradation from the edges to the center portion is smaller than that in FIG. 11A.

In the mask pattern for location B in FIG. 11D, as well as in FIG. 11B, the printing rate through three scans is 200%. Further, of 768 nozzles to be used, the printing rate for the nozzles located at the ends is 40%, and the printing rate for the nozzles located in the center is 80%. The rate of the printing rate of the edges relative to the center portion is 0.5. This rate is greater than that for the masks used for the leading portion and the trailing portion of the printing medium, though all of these masks are for location B. That is, the inclination of the gradation from the edges to the center portion is smaller than that in FIG. 11B. It should be noted, however, that the value of 0.5 is the same as that for the mask pattern for location A used for the center portion shown in FIG. 11C.

The previously described problem related to the generation of an air stream, i.e., the end-deviation problem, can be coped with, to a degree, by employing the mask patterns shown in FIGS. 11A to 11D. That is, the generation of an air stream can be suppressed when the printing rates for the individual nozzles are so designated that the printing rate is the maximum for the center portion and gradually reduced toward the edges. Furthermore, even when ink droplets discharged through the nozzles at the edges land at shifted positions, a barrier due to the shifting of the landing positions becomes less noticeable because the number of dots is reduced. This countermeasure can be more effective when the inclination of the printing rates from the edges to the center portion is adjusted in accordance with the degree to which the imaging barrier is caused by the end-deviation problem.

It has been confirmed that the air stream problem more apparently appears as the density of the ink droplets discharged becomes higher. That is, the edge deviation is more easily identified in an area having a high printing duty than in an area having a low printing duty. Therefore, in this embodiment, even for the same leading or trailing portion, a mask pattern having a larger inclination is employed for location B, which affects an image having a high duty wherein the end-deviation problem more frequently occurs.

In the above-described embodiment, the actually employed mask pattern is one mask pattern obtained by superimposing the mask pattern for location A (FIG. 11A or FIG. 11C) and the mask pattern for location B (FIG. 11B or FIG. 11D). It should be noted that the mask pattern for the leading portion area or the trailing portion area and the mask pattern for the center portion are independently employed, and are stored in separate areas in the memory of the ink jet print apparatus.

As described above, according to this embodiment, the deterioration of the image quality at the leading portion and the trailing portion of the printing medium has especially been focused on. The area enhanced in a high duty image and the area required even for printing for a low duty image are classified, and characteristic mask patterns are employed for the individual areas. With this arrangement, a change in the type of image barrier that occurs concurrently with a change in the duty can be coped with appropriately.

Third Embodiment

A third embodiment of the present invention will now be described. In this embodiment, as well as in the first and the second embodiments, it is assumed that the arrangement shown in FIGS. 1 to 8 can be applied for the image data conversion processing, the dot arrangement patterning processing and the mask data conversion processing, and that the high-quality-image photo mode and the high-speed mode are prepared.

According to an ink jet print apparatus for this embodiment, a mask pattern having a high dispersion dot arrangement, as described in Japanese Patent Application Laid-Open No. 2002-144522, is employed as a mask pattern for location A. Since in the dispersion of the dot arrangement this mask pattern is superior, it is especially effective when used to remove the granularity in an image having a low duty.

A mask pattern having a random property, as described in Japanese Patent Application Laid-Open No. 6-330616 (1994), is employed as a mask pattern for location. B. The characteristic of this mask pattern is that, regardless of the method employed for the half toning process J0005, a stable output image can be obtained without any interference being encountered with an output pattern. If interference should occur between a mask pattern used in the mask data conversion process J00085 and a pattern output in the half toning process J0005, the image quality would be deteriorated, e.g., the intended effect to be provided by a created mask pattern would not be obtained, or uniformity within an image would be lost.

Therefore, in this embodiment, as a countermeasure for a low-duty image for which reducing the granularity is more important, a mask pattern providing superior dispersion is employed as the mask pattern for location A, while as a countermeasure for a high-duty image for which uniformity deterioration is a problem, a mask pattern having a random property is employed as a mask pattern for location B.

Also, in many cases, for a color ink jet print apparatus, as in the embodiment, that discharges inks having multiple colors, different mask patterns are employed for the individual colors. The effects of the invention can, of course, be obtained by employing a configuration wherein the mask patterns provided for individual colors differ. And when, as a problem, an imaging barrier differs, depending on the ink color, a mask pattern appropriate for each color may be prepared for location A and location B.

Furthermore, in the above embodiments, as shown in FIG. 1, an explanation has been given for the printing system comprising: the host that exercises control up to the half toning process and the ink jet apparatus that controls the image processing that follows the dot arrangement patterning process. However, the present invention is not limited to this system. The present invention may also be applied for an ink jet print apparatus, a copier or a facsimile machine that can perform all the processing, or a system that comprises a plurality of apparatuses other than a host computer.

The technique that employs a mask pattern for a multi-pass for input data, and that performs enhanced printing for identical areas has already been disclosed in Japanese Patent Application Laid-Open No. 5-278232 (1993), for example. However, according to a conventional representative enhancement method, as disclosed in this publication, dots to be enhanced are determined at random by using a mask pattern for a binarized dot array. That is, in the configuration of the ink jet print apparatus of the embodiments, wherein multi-valued gradation data are obtained by half toning and wherein appropriate gradation is expressed by performing the dot arrangement patterning process, dots are enhanced, regardless of the dot arrangement within the area of a pixel, so that the multi-valued gradation data provided for the pixel no longer have any definition. On the other hand, in this invention, a mask pattern is formed, while taking into account a dot arrangement pattern that is consonant with the multi-valued gradation data provided for a pixel, and enhancement printing can be performed equally and linearly for individual pixels. Therefore, the feature of the invention is that a definition for the multi-valued gradation data provided for one pixel is retained.

It should be emphasized that several modifications (e.g., alterations of the number of gradation levels obtained in the half toning process, the number of dots arranged in the dot arrangement patterning process and the number of scans performed for an identical area) can be applied for the above described embodiments, without departing from the teachings of the present invention. It should especially be understood that all matters included in this disclosure and illustrated in the accompanying drawings are merely examples and should not be interpreted as limitations placed on the present invention. The scope of the present invention is to be determined based on the following claims.

According to the present invention, since the first mask pattern, which greatly affects a low-duty image, and the second mask pattern, which greatly affects a high-duty image, can be independently designed, a low-duty image problem that occurs and a high-duty image problem that occurs can be coped with by employing the separate mask patterns.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications.

This application claims priority from Japanese Patent Application No. 2004-251077 filed Aug. 30, 2004, which is hereby incorporated by reference herein.

What is claimed is:

1. An ink jet printing method for printing an image of dots on a printing medium by scanning a print head for printing dots, comprising the steps of:

selecting a dot arrangement pattern determining a presence/absence of dots in multiple areas that constitute a pixel, in accordance with a density value for each of multiple pixels;

distributing print dot data based on the dot arrangement pattern selected in said selecting step to multiple scans of the print head by a mask pattern, and generating print dot data corresponding to each of the multiple scans; and printing dots using the print head in accordance with the generated print dot data, wherein the mask pattern is the sum of a first mask pattern and a second mask pattern, the first mask pattern corresponding to a first location that includes areas wherein dots are to be printed even if the density value is smaller than a predetermined value, and a second mask pattern having a characteristic differing from that of the first mask pattern and corresponding to a second location that includes areas wherein dots are to be printed only when the density value is equal to or greater than the predetermined value.

2. An ink jet printing method according to claim 1, wherein, using multiple scans, up to one dot is printed in the areas included in the first location, and two dots or more are printed in the areas included in the second location only when the density value is equal to or greater than the predetermined value.

3. An ink jet printing method according to claim 1, wherein a mask pattern used for printing to a leading portion or trailing portion of the printing medium is different from a mask pattern used for printing to an area other than the leading portion or the trailing portion.

4. An ink jet printing method according to claim 3, wherein the number of printing elements used for printing to the leading portion or the trailing portion of the printing medium is smaller than the number of printing elements used for printing to an area other than the leading portion or the trailing portion.

5. An ink jet printing method according to claim 1, wherein printing permitted areas in the first mask pattern are more dispersed than in the second mask pattern.

6. An ink jet printing method according to claim 1, wherein printing permitted areas in the second mask pattern are closer together than in the first mask pattern.

7. An ink jet printing method according to claim 1, wherein frequencies of dot positions to be printed during one scan differ between the first mask pattern and the second mask pattern.

8. An ink jet printing method according to claim 1, wherein the ratios of printing permitted areas consonant with the printing elements differ between the first mask pattern and the second mask pattern.

9. An ink jet printing method according to claim 1, wherein the print head is capable of discharging ink having multiple colors, and for at least one of the multiple colors, at least one of the first mask pattern and the second mask pattern differs from that for the other colors.

10. An ink jet printing system for printing an image of dots on a printing medium by scanning a print head for printing dots, comprising;
    means for preparing print dot data in consonance with each of multiple scans, employing a mask pattern to sort print dot data based on a dot arrangement pattern that is allocated for the multiple scans performed by the print head; and
    means for selecting a dot arrangement pattern determining a presence/absence of dots in multiple areas that constitute a pixel, in accordance with a density value for each of multiple pixels;
    means for distributing print dot data based on the dot arrangement pattern selected by said selecting means to the multiple scans of the print head by a mask pattern, and generating print dot data corresponding to each of multiple scans; and
    means for printing dots using the print head in accordance with the generated print dot data,
    wherein the mask pattern is the sum of a first mask pattern and a second mask pattern, the first mask pattern corresponding to a first location that includes areas wherein dots are to be printed even if the density value is smaller than a predetermined value, and a second mask pattern having a characteristic differing from that of the first mask pattern and corresponding to a second location that includes areas wherein dots are to be printed only when the density value is equal to or greater than the predetermined value.

* * * * *

UNITED STATES PATENT AND TRADEMARK OFFICE
CERTIFICATE OF CORRECTION

| | |
|---|---|
| PATENT NO. | : 7,303,247 B2 |
| APPLICATION NO. | : 11/209629 |
| DATED | : December 4, 2007 |
| INVENTOR(S) | : Maru et al. |

It is certified that error appears in the above-identified patent and that said Letters Patent is hereby corrected as shown below:

COLUMN 4:
Line 52, "B bit" should read --8 bit--.

Signed and Sealed this

Third Day of February, 2009

JOHN DOLL
*Acting Director of the United States Patent and Trademark Office*